(12) United States Patent
Hung et al.

(10) Patent No.: US 8,690,353 B2
(45) Date of Patent: *Apr. 8, 2014

(54) MULTI-RESOLUTION DISPLAY SYSTEM

(75) Inventors: Yi-Ping Hung, Taipei (TW); Li-Wei Chan, New Taipei (TW)

(73) Assignee: National Taiwan University, Taipei (TW)

( * ) Notice: Subject to any disclaimer, the term of this patent is extended or adjusted under 35 U.S.C. 154(b) by 252 days.

This patent is subject to a terminal disclaimer.

(21) Appl. No.: 13/189,594

(22) Filed: Jul. 25, 2011

(65) Prior Publication Data

US 2012/0154756 A1 Jun. 21, 2012

(30) Foreign Application Priority Data

Dec. 15, 2010 (TW) ................................ 99144060 A

(51) Int. Cl.
*G03B 21/20* (2006.01)

(52) U.S. Cl.
USPC .................... 353/85; 353/30; 353/31; 353/70; 353/100; 353/101; 382/254; 345/9

(58) Field of Classification Search
USPC ........... 353/30, 31, 34, 69, 70, 74, 79, 85, 94, 353/100, 101; 348/42–60, 112–124; 345/7–9, 630, 632, 633, 672, 679, 681; 382/103, 117, 154, 254; 250/208.1, 250/221, 330, 332, 336.1, 338.1
See application file for complete search history.

(56) References Cited

U.S. PATENT DOCUMENTS

| 6,890,077 | B2 * | 5/2005 | Dunn ............................ 351/224 |
| 7,697,750 | B2 * | 4/2010 | Simmons ...................... 382/154 |
| 7,967,444 | B2 * | 6/2011 | Hung et al. .................... 353/30 |
| 2005/0195373 | A1 * | 9/2005 | Feigel et al. ................... 353/94 |
| 2006/0289760 | A1 * | 12/2006 | Bathiche ....................... 250/332 |
| 2008/0079753 | A1 * | 4/2008 | Victor et al. .................. 345/660 |

* cited by examiner

*Primary Examiner* — Sultan Chowdhury
(74) *Attorney, Agent, or Firm* — Jianq Chyun IP Office

(57) ABSTRACT

A multi-resolution display system including a desktop display area, a foveal projection device, a sensor, a control unit, and a manually adjustable fixture is provided. The desktop display area displays a central image and a low-resolution image. The control unit determines six-dimensional (6D) orientation information of the foveal projection device relative to the desktop display area according to a projected image detected by the sensor, so as to control the foveal projection device to project the central image within a target area on the desktop display area. The manually adjustable fixture fixes the foveal projection device on top of the desktop display area, and the movement of the manually adjustable fixture has a freedom of up to six dimensions.

10 Claims, 5 Drawing Sheets

MULTI-RESOLUTION DISPLAY SYSTEM

CROSS-REFERENCE TO RELATED APPLICATION

This application claims the priority benefit of Taiwan application serial no. 99144060, filed on Dec. 15, 2010. The entirety of the above-mentioned patent application is hereby incorporated by reference herein and made a part of specification.

BACKGROUND OF THE INVENTION

1. Field of the Invention

The invention generally relates to a display system, and more particularly, to a multi-resolution display system.

2. Description of Related Art

Due to the increasing demand for space efficiency, digital desk that can carry out word processing tasks and display digital images has become one of the new trends. Mark Ashdown published an article titled "The Escritoire: A Personal Projected Display for Interacting with Documents" in 2002, where a digital file is projected onto a desk by using a projection device and a reflective mirror. In this technique, the design of the entire system is adjusted by taking the special structure of human vision into consideration. Human vision includes foveal vision and peripheral vision. Foveal vision is also referred to as direct vision, and which is suitable for identifying details in images and color information but is not suitable for identifying shadows. However, peripheral vision is good at shadow identification. Thus, if one gazes at an object intensely, the effect of peripheral vision gradually decreases as time goes on. For example, when one stares at one character among many characters of a letter more and more intensely, the other characters in the letter will gradually blur off.

Based on the special structure of human vision, two projectors are disposed in a conventional digital desk system. One of the projectors projects images that have larger sizes and are blurrier (of lower resolutions), while the other projector projects images that have smaller sizes and are sharper (of higher resolutions). In order to carry out operations (for example, to move digital files), this system provides pens of two different detection systems. Because these two detection systems should not interfere with each other, one of the pens is an ultrasonic pen and the other pen is an electromagnetic pen. Herein the ultrasonic pen is used for moving digital files, and the electromagnetic pen is used for writing to files.

However, in such a conventional digital desk system, because the projection sources are all placed on top or in front of the desk, the entire system takes up a large space. Meanwhile, with such a projection source design, when a user writes or operates, the displayed image may be blocked by and accordingly projected onto the user's arm so that some viewers may not be able to view the displayed image comfortably. Additionally, because all the high-resolution projection devices are fixed to specific positions, it is impossible to display high-resolution images in other areas, which reduces the flexibility in the operation of the digital desk system.

In Tabletop Conference 2008, Ting-Ting Hu and his partners released a multi-resolution digital desktop display system. In this system, a peripheral projection device and a foveal projection device for presenting images are disposed below the desk, so as to reduce the space taken up by the entire system. Meanwhile, images are projected from below the desk so that the presented images are prevented from being blocked by a user's arm. However, in such a design, because the projection equipments and the desk have an integral design, it is impossible to add new projection equipment below the desk or present multiple high-resolution images.

A multi-resolution digital desktop display system is disclosed in Taiwan Patent No. 200900831. In this technique, a peripheral projection device and a foveal projection device for presenting images are also disposed below the desk so that it is also impossible to add new projection equipment. Besides, in this multi-resolution digital desktop display system, the projected position of a central image is changed by changing the reflection angle of a reflective mirror with an electric motor. Thus, some restrictions are applied when the projected position of the central image is changed. For example, the projected position of the central image cannot be changed at fixed intervals.

SUMMARY OF THE INVENTION

Accordingly, the invention is directed to a multi-resolution display system in which multiple high-resolution images can be presented and new projection equipments can be added without any space limitation.

The invention provides a multi-resolution display system including a desktop display area, a foveal projection device, a sensor, a control unit, and a manually adjustable fixture. The desktop display area displays a central image and a low-resolution image. The central image has a first resolution, and the low-resolution image has a second resolution. The foveal projection device projects the central image within a target area on the desktop display area. The sensor detects a projected image on the desktop display area. The control unit is coupled to the sensor and the foveal projection device. The control unit determines six-dimensional (6D) orientation information of the foveal projection device relative to the desktop display area according to the projected image detected by the sensor, so as to determine the position and size of the target area and control the foveal projection device to project the central image. The manually adjustable fixture fixes the foveal projection device on top of the desktop display area, and the movement of the manually adjustable fixture has a freedom of up to six dimensions.

According to an embodiment of the invention, the sensor is disposed on the foveal projection device.

According to an embodiment of the invention, the first resolution is higher than the second resolution.

According to an embodiment of the invention, the multi-resolution display system further includes a peripheral projection device located below the desktop display area. The peripheral projection device is controlled by the control unit to display the low-resolution image on the desktop display area in a rear projection manner, where a display area of the low-resolution image is the area on the desktop display area outside the target area.

According to an embodiment of the invention, the sensor is a color camera.

According to an embodiment of the invention, the multi-resolution display system further includes an infrared projector. The infrared projector projects a predetermined pattern on the desktop display area.

According to an embodiment of the invention, the sensor is an infrared camera for detecting the predetermined pattern, and the control unit determines the 6D orientation information of the foveal projection device relative to the desktop display area according to the predetermined pattern detected by the infrared camera.

According to an embodiment of the invention, the foveal projection device further projects a predetermined pattern on the desktop display area by using infrared light.

According to an embodiment of the invention, the foveal projection device further includes an infrared projector disposed in the foveal projection device. The infrared projector projects the predetermined pattern.

As described above, in the invention, a foveal projection device is fixed on top of a desktop display area by using a manually adjustable fixture, so as to display multi-resolution images on the desktop display area. Accordingly, more projection equipments can be added without being restricted by the limited space below the desk.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
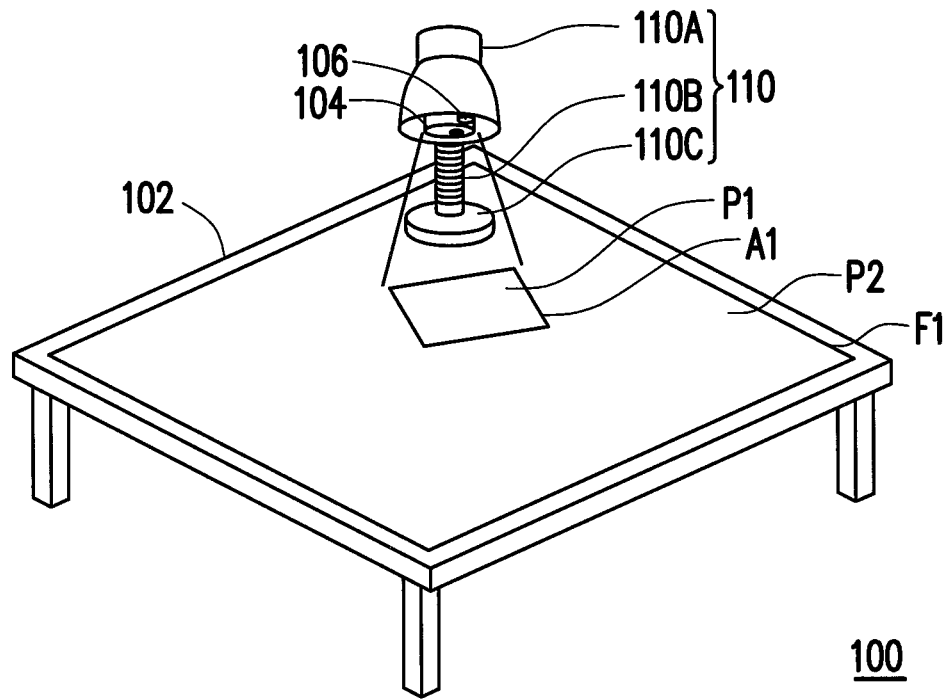
FIG. 1 is a diagram of a multi-resolution display system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
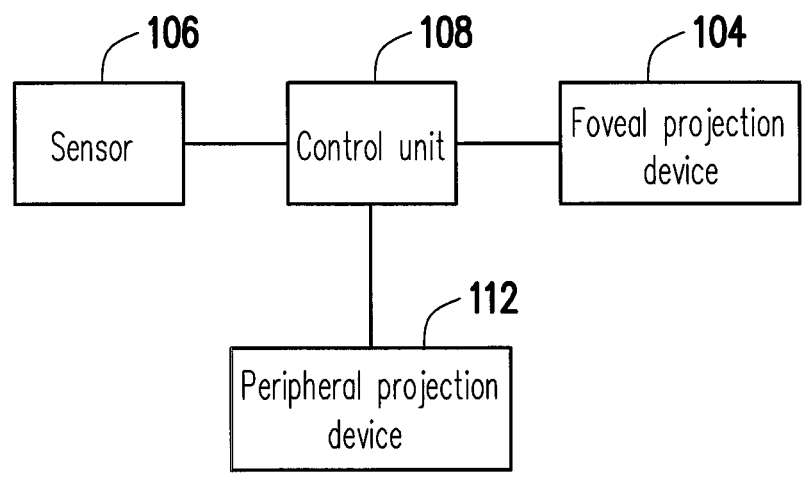
FIG. 2 is a diagram illustrating the coupling relationship between a foveal projection device, a sensor, a control unit, and a peripheral projection device.
Figure 3:
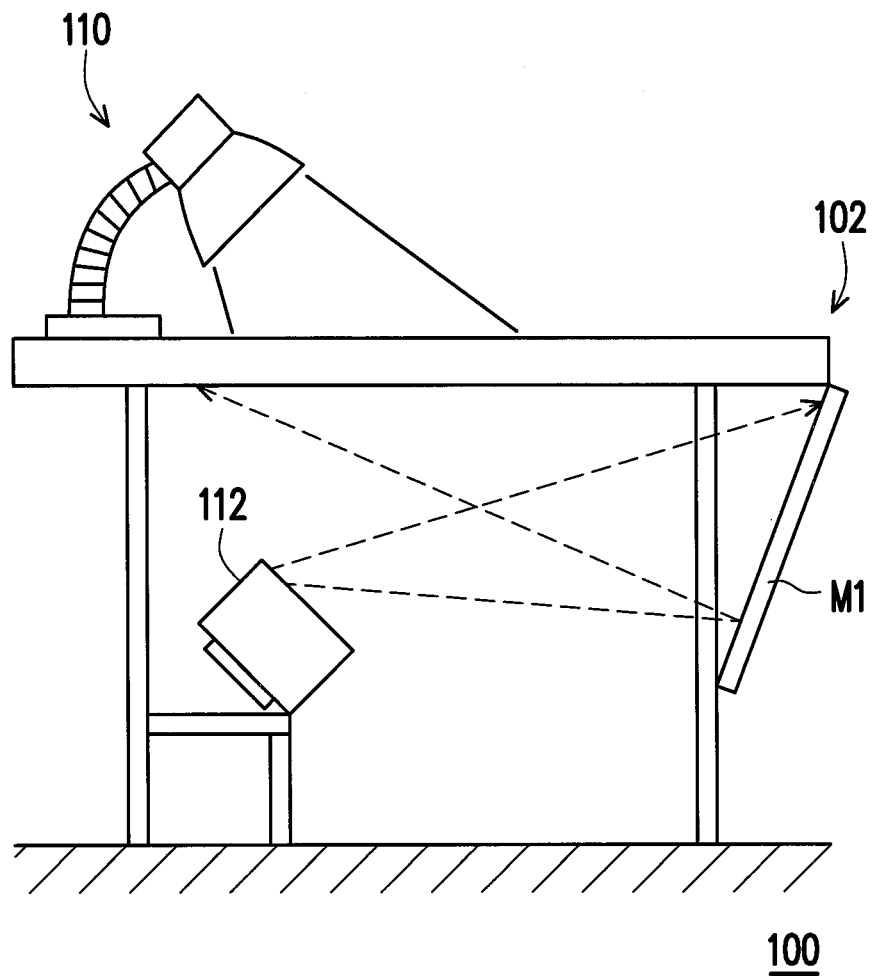
FIG. 3 is a side view of the multi-resolution display system in FIG. 1.

FIG. 1 is a diagram of a multi-resolution display system according to an embodiment of the invention. FIG. 2 is a diagram illustrating the coupling relationship between a foveal projection device, a sensor, a control unit, and a peripheral projection device. FIG. 3 is a side view of the multi-resolution display system in FIG. 1. Referring to FIG. 1-FIG. 3, the multi-resolution display system 100 includes a desk 102, a foveal projection device 104, a sensor 106, a control unit 108 (as shown in FIG. 2), a manually adjustable fixture 110, and a peripheral projection device 112 (as shown in FIG. 3). The desk 102 includes a desktop display area F1. The sensor 106 is disposed on the foveal projection device 104, and the foveal projection device 104 and the sensor 106 are fixed on the manually adjustable fixture 110 and located above the desktop display area F1. The manually adjustable fixture 110 can move in up to six dimensions. For example, the manually adjustable fixture 110 in the embodiment illustrated in FIG. 1 includes a base 110A, a bellow 110B, and an assembly portion 110C having a housing structure. The foveal projection device 104 and the sensor 106 are fixed on the assembly portion 110C, and the assembly portion 110C is connected to the base 110A through the bellow 110B so that the foveal projection device 104 and the sensor 106 fixed on the assembly portion 110C can be flexibly adjusted to different directions and angles. A user can also move the manually adjustable fixture 110 on the desktop display area F1 to allow the foveal projection device 104 to achieve an optimal projection effect according to the user's requirement. Additionally, the peripheral projection device 112 is disposed in the containing space below the desk 102.

The coupling relationship between the foveal projection device 104, the sensor 106, the control unit 108, and the peripheral projection device 112 is as shown in FIG. 2. The control unit 108 is coupled to the foveal projection device 104, the sensor 106, and the peripheral projection device 112. The sensor 106 may be a color camera, and which detects a projected image on the desktop display area F1. The control unit 108 determines six-dimensional (6D) orientation information of the foveal projection device 104 relative to the desktop display area F1 according to the projected image detected by the sensor 106, so as to determine the position and size of a target area A1 on the desktop display area F1 and the image content of a central image P1 projected within the target area A1 and control the foveal projection device 104 to project the central image P1 within the target area A1. Additionally, the control unit 108 controls the peripheral projection device 112 to display a low-resolution image P2 on the desktop display area F1 in a rear projection manner according to the projected image detected by the sensor 106.

As shown in FIG. 3, a rear-projection reflective mirror M1 is further disposed opposite to the peripheral projection device 112. A predetermined angle is formed between the rear-projection reflective mirror M1 and the desktop display area F1 such that the low-resolution image P2 projected by the peripheral projection device 112 can be reflected onto the desktop display area F1. Herein the display area of the low-resolution image P2 is the area outside the target area A1 on the desktop display area F1, and the central image P1 and the low-resolution image P2 have different resolutions. For example, in the present embodiment, the resolution of the central image P1 is higher than that of the low-resolution image P2. However, the invention is not limited thereto.

Even though the present embodiment is described by assuming that one foveal projection device 104 performs operations of the multi-resolution display system 100, the invention is not limited thereto. In an actual application, multiple foveal projection devices 104 may be disposed to project multiple central images P1 on the desktop display area F1, where a sensor 106 and a manually adjustable fixture 110 should be disposed corresponding to each foveal projection device 104.

Figure 4:
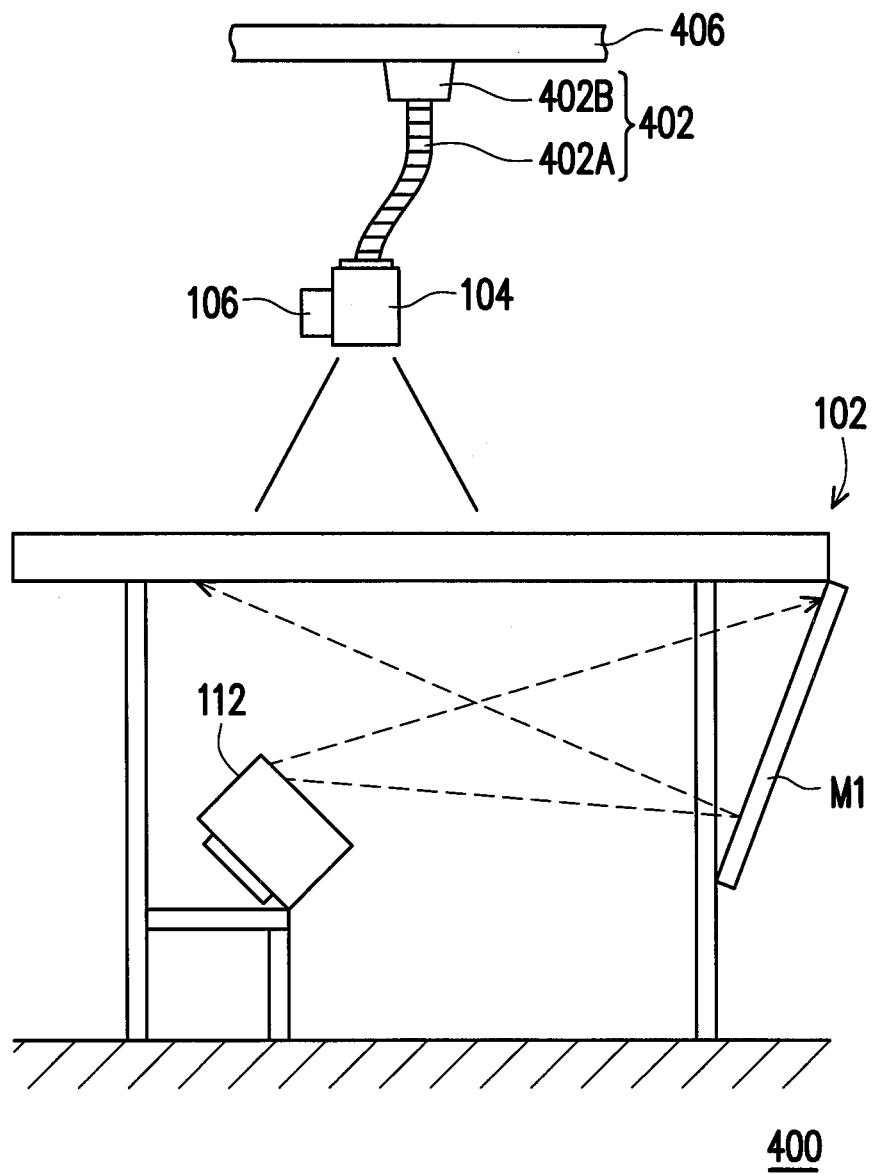
FIG. 4 is a diagram of a multi-resolution display system according to another embodiment of the invention.

In addition, the implementation of the manually adjustable fixture 110 is not limited to that in the embodiment illustrated in FIG. 1, and any fixture with 6D freedom can be served as the manually adjustable fixture 110. FIG. 4 illustrates a multi-resolution display system 400 according to another embodiment of the invention. In the present embodiment, the manually adjustable fixture 402 includes only a bellow 402A and a base 402B. The foveal projection device 104 is connected to the base 402B which is connected to the ceiling 406 through the bellow 402A, so as to hand the foveal projection device 104 and the sensor 106 in the air. A user can rotate or shift the foveal projection device 104 and the sensor 106 randomly above the desktop display area F1, so as to allow the foveal projection device 104 to project the central image P1 at any position on the desktop display area F1.

As described above, the foveal projection device 104 is fixed above the desktop display area F1 by using the manually adjustable fixture 110, and a projected image on the desktop display area F1 is detected by using the sensor 106, so that the control unit 108 can determine the 6D orientation information of the foveal projection device 104 relative to the desktop display area F1 and control the foveal projection device 104 to project the central image P1, so as to display a multi-resolution image on the desktop display area F1. Thereby, when multiple central images are to be projected onto the desktop display area F1, more projection equipments can be added without being restricted by the containing space below the desk 102.

Figure 5:
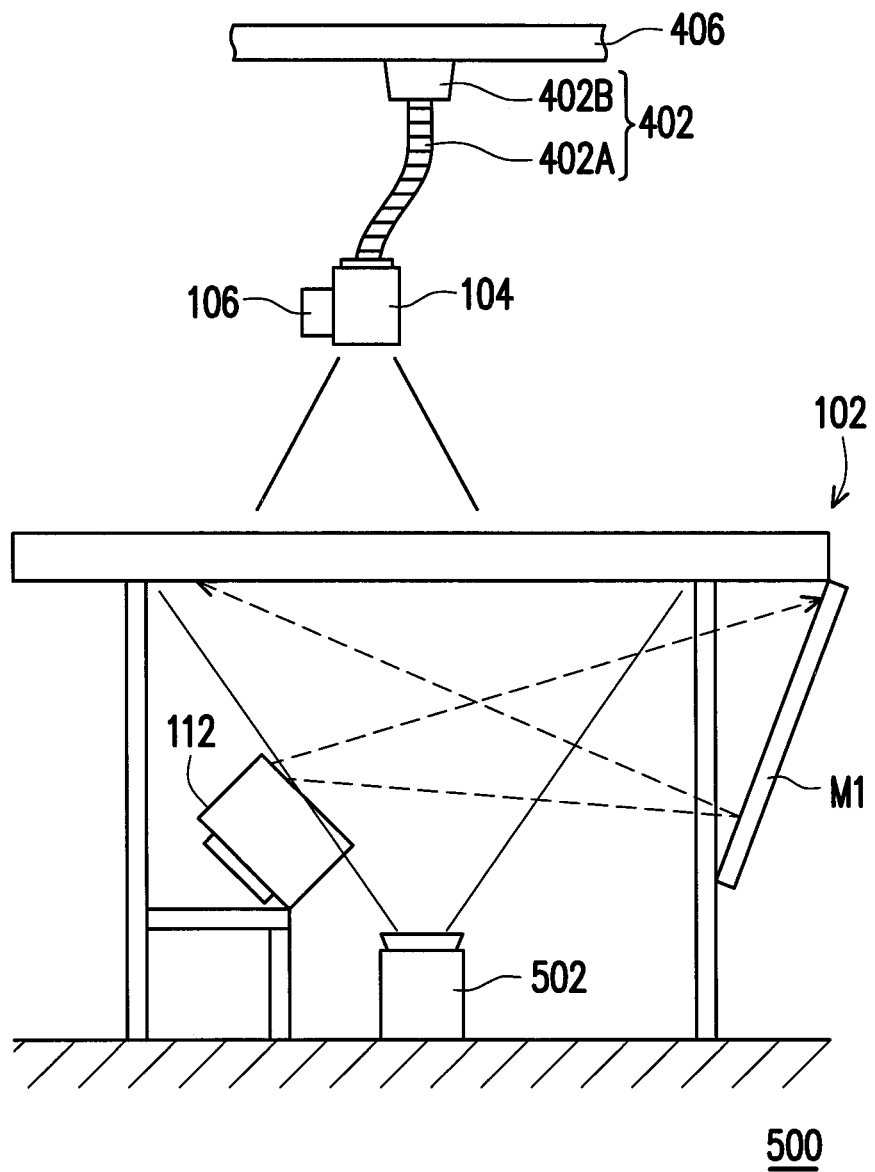
FIG. 5 is a diagram of a multi-resolution display system according to another embodiment of the invention.

FIG. 5 is a diagram of a multi-resolution display system according to another embodiment of the invention. Referring to FIG. 5, the differences between the multi-resolution display system 500 in the present embodiment and the multi-resolution display system 400 in FIG. 4 are that the multi-resolution display system 500 further includes an infrared projector 502 and the sensor 106 is an infrared camera. The infrared projector 502 is disposed below the desk 102, and which projects a predetermined pattern on the desktop display area F1 in a rear projection manner. The predetermined pattern may be a coordinate graph or other predetermined geometric pattern. The sensor 106 detects the predetermined pattern projected by the infrared projector 502.

Additionally, the control unit 108 analyzes the predetermined pattern detected by the sensor 106. Because the relative position between the sensor 106 and the foveal projection device 104 remains unchanged and the predetermined pattern is known, the 6D orientation information of the foveal projection device 104 relative to the desktop display area F1 can be precisely calculated by the control unit 108 which analyzes the predetermined pattern detected by the sensor 106, and accordingly the foveal projection device 104 and the peripheral projection device 112 can be controlled to respectively project the central image P1 and the low-resolution image P2 on the desktop display area F1.

Figure 6:
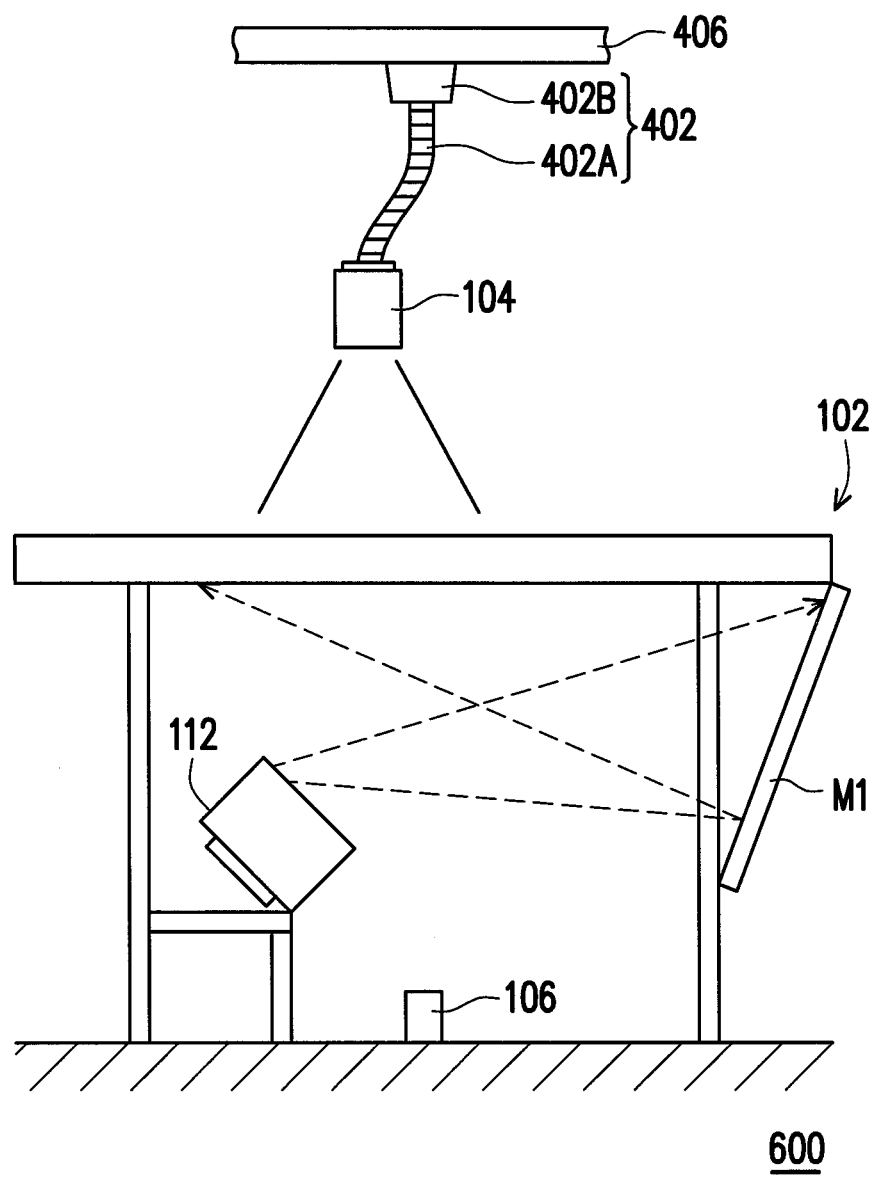
FIG. 6 is a diagram of a multi-resolution display system according to another embodiment of the invention.

It should be noted that in some embodiments, the sensor 106 does not have to be disposed on the foveal projection device 104. FIG. 6 is a diagram of a multi-resolution display system according to another embodiment of the invention. Referring to FIG. 6, it is assumed in the present embodiment that the foveal projection device 104 can project visible light and invisible light (for example, infrared light) at the same time and the sensor 106 (may be an infrared camera) can detect the invisible light projected by the foveal projection device 104. The difference between the multi-resolution display system 600 in the present embodiment and the multi-resolution display system 400 illustrated in FIG. 4 is that in the present embodiment, the sensor 106 is disposed below the desk 102. The foveal projection device 104 projects a predetermined pattern on the desktop display area F1 with invisible light. Meanwhile, the sensor 106 (may be an infrared camera) detects the predetermined pattern projected with invisible light by the foveal projection device 104. Herein the foveal projection device 104 may be implemented to project both visible light and infrared light by installing an infrared projector in the foveal projection device 104 or mounting an infrared projector on the foveal projection device 104.

The control unit 108 analyzes the predetermined pattern detected by the sensor 106. Because the relative position between the infrared projector and the foveal projection device 104 remains unchanged, the 6D orientation information of the foveal projection device 104 relative to the desktop display area F1 can be precisely calculated by the control unit 108 which analyzes the predetermined pattern detected by the sensor 106, and accordingly the foveal projection device 104 and the peripheral projection device 112 can be controlled to respectively project the central image P1 and the low-resolution image P2 on the desktop display area F1.

In summary, according to the invention, a foveal projection device is fixed above a desktop display area by using a manually adjustable fixture, and a projected image on the desktop display area is detected by using a sensor, so that a control unit can determine 6D orientation information of the foveal projection device relative to the desktop display area according to the projected image detected by the sensor and accordingly control the foveal projection device to project a central image, so as to display a multi-resolution image on the desktop display area. Thereby, when multiple central images are to be projected on the desktop display area, more projection equipments can be added without being restricted by the limited containing space below the desk. Moreover, by adjusting the position of the foveal projection device manually, the projected position of the central image is made more flexible, so that the situation in the conventional technique that the projected position of the central image can only be changed at fixed intervals but cannot be fine tuned can be avoided.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A multi-resolution display system, comprising:
   a desktop display area, displaying a central image and a low-resolution image, wherein the central image has a first resolution, and the low-resolution image has a second resolution;
   a foveal projection device, projecting the central image within a target area on the desktop display area;
   a sensor, detecting a projected image on the desktop display area;
   a control unit, coupled to the sensor and the foveal projection device, determining six-dimensional (6D) orientation information of the foveal projection device relative to the desktop display area according to the projected image detected by the sensor, so as to determine a position and a size of the target area and control the foveal projection device to project the central image; and
   a manually adjustable fixture, fixing the foveal projection device on top of the desktop display area, wherein movement of the manually adjustable fixture has a freedom of up to six dimensions.

2. The multi-resolution display system according to claim 1, wherein the sensor is disposed on the foveal projection device.

3. The multi-resolution display system according to claim 1, wherein the first resolution is higher than the second resolution.

4. The multi-resolution display system according to claim 1 further comprising:
   a peripheral projection device, located below the desktop display area, controlled by the control unit to display the low-resolution image on the desktop display area in a rear projection manner, wherein a display area of the low-resolution image is an area on the desktop display area outside the target area.

5. The multi-resolution display system according to claim 1, wherein the sensor is a color camera.

6. The multi-resolution display system according to claim 1 further comprising:
   an infrared projector, projecting a predetermined pattern on the desktop display area.

7. The multi-resolution display system according to claim 6, wherein the sensor is an infrared camera for detecting the predetermined pattern, and the control unit determines the 6D orientation information of the foveal projection device relative to the desktop display area according to the predetermined pattern detected by the infrared camera.

8. The multi-resolution display system according to claim 1, wherein the foveal projection device further projects a predetermined pattern on the desktop display area by using infrared light.

9. The multi-resolution display system according to claim 8, wherein the foveal projection device further comprises:
   an infrared projector, disposed in the foveal projection device, projecting the predetermined pattern.

10. The multi-resolution display system according to claim 8, wherein the sensor is an infrared camera for detecting the predetermined pattern, and the control unit determines the 6D orientation information of the foveal projection device relative to the desktop display area according to the predetermined pattern detected by the infrared camera.

\* \* \* \* \*